United States Patent
Fujiwara et al.

(10) Patent No.: US 8,856,465 B2
(45) Date of Patent: Oct. 7, 2014

(54) MEMORY CONTROL APPARATUS AND MEMORY CONTROL METHOD FOR CONTROLLING THE PRIORITY OF MEMORY ACCESSES

(75) Inventors: Makoto Fujiwara, Inagi (JP); Wataru Ochiai, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 23 days.

(21) Appl. No.: 13/225,294

(22) Filed: Sep. 2, 2011

(65) Prior Publication Data

US 2012/0072681 A1    Mar. 22, 2012

(30) Foreign Application Priority Data

Sep. 17, 2010    (JP) .................................. 2010-209418

(51) Int. Cl.
*G06F 12/00*    (2006.01)
*G06F 1/32*    (2006.01)

(52) U.S. Cl.
CPC ........... *G06F 1/3225* (2013.01); *Y02B 60/1225* (2013.01); *G06F 1/3275* (2013.01)
USPC .................... 711/154; 711/E12.001

(58) Field of Classification Search
USPC .......................................... 711/154, E12.001
See application file for complete search history.

(56) References Cited

U.S. PATENT DOCUMENTS

| | | | |
|---|---|---|---|
| 5,664,089 A * | 9/1997 | Byers et al. ..................... | 714/14 |
| 2009/0046523 A1* | 2/2009 | Maki ............................ | 365/200 |
| 2010/0005209 A1* | 1/2010 | Mochida et al. .............. | 710/240 |

FOREIGN PATENT DOCUMENTS

JP    8-153065 A    6/1996

* cited by examiner

*Primary Examiner* — Mardochee Chery
(74) *Attorney, Agent, or Firm* — Canon USA Inc. IP Division

(57) ABSTRACT

Memory accesses to a memory device that is in a power saving mode depend on the order of the issuance thereof. Thus, a period of time during which the memory is placed in the power saving mode is sometimes shortened, resulting in less effective power savings. A memory control apparatus, which is connected with a plurality of masters and a plurality of memories having a power saving mode, arbitrates memory accesses from the plurality of the masters, monitors whether each of the plurality of the memories is in the power saving state, and determines the priorities of the memory accesses according to the result of the detection of the power saving mode.

11 Claims, 10 Drawing Sheets

MEMORY CONTROL APPARATUS AND MEMORY CONTROL METHOD FOR CONTROLLING THE PRIORITY OF MEMORY ACCESSES

BACKGROUND OF THE INVENTION

1. Field of the Invention

The present invention relates to a memory control apparatus connected with a plurality of bus masters and a plurality of memories, and more particularly, relates to a memory control apparatus and a memory control method for, in the case of competing memory accesses, controlling the priorities of those memory accesses.

2. Description of the Related Art

Recent large-scale integration (LSI) circuits have included, on the chip, many information processors (IPs) in addition to a central processing unit (CPU), to achieve higher functionality. In systems including such an LSI circuit, since individual IPs simultaneously process data, a high-capacity high-speed memory is often mounted on the system substrate together with the LSI circuit.

Synchronous dynamic random access memory (SDRAM) devices, for example, have been used as memory devices. Nowadays, to enable faster access, a plurality of high-speed memory devices, such as double data rate (DDR)-SDRAMs, DDR2-SDRAMs, and DDR3-SDRAMs, are sometimes employed.

On the other hand, mainly in battery-powered systems, various efforts are made to reduce power consumption within the entire system. For example, memory devices have a low power consumption mode, so that the memories shift to the low power consumption mode when there is no memory access, and power consumption in the memory devices can be reduced.

To achieve power savings, a memory control apparatus needs to control memory access to extend periods of time during which the memories are placed in the low power consumption mode.

For example, Japanese Patent Application Laid-Open No. 8-153065 discusses a method for, when the priorities of memory accesses need to be changed by monitoring the states of memories (slaves), changing the priorities of transfer requests from a plurality of bus masters by monitoring the states of the memories (slaves). In Japanese Patent Application Laid-Open No. 8-153065, it is determined whether each slave is in a state in which the slave can readily process a transfer request from a bus master. A transfer request to the slave that has been determined not to be able to readily perform processing is masked. Then the transfer is accepted from among the transfer requests to the slave that has been determined to be able to readily perform processing.

There is a memory control apparatus that controls a memory, such as a DRAM, connected externally of a chip as one of slave modules in a system. Such a memory control apparatus of the DRAM has a function for converting a memory access from a bus master to a protocol for the connected DRAM to issue the memory access. Some memory control apparatuses also have a function for controlling a power mode of an external DRAM. As a configuration for implementing a memory control circuit having the function for controlling the power mode of an external DRAM, there is a memory control circuit which explicitly receives the designation of the power mode from the system, and issues a power mode control command for bringing the DRAM into a power-down mode or for turning in and out of a self-refresh mode.

In this case, the explicit designation from the system makes fine control difficult. On the other hand, there is a memory control apparatus that have a function for automatically controlling a power supply mode according to the presence or absence of a memory access received from a bus master. More specifically, such a memory control apparatus functions as follows. When there is no transfer request from the bus master, the memory control apparatus places the memory in a power saving mode. When a transfer request is made to the memory placed in the power saving mode, the memory control apparatus returns the memory from the power saving mode to the normal state in which memory access is available.

The conventional arbitration method is performed based on the assumption that the state of the slave automatically changes from a "not readily available" state to a "readily available" state.

In such a memory control apparatus, if "the state in which a slave can readily process a transfer request from a bus master" is replaced by "the state in which a memory is placed in the power saving mode", then an access to the memory placed in the power saving mode will be masked. In other words, the memory access will be masked although the memory access can be issued if the memory returns from the power saving mode.

If the access to the memory device placed in the power saving mode is masked, the memory being in the power saving mode remains in that power saving mode. Hence, no memory transfer is performed.

On the other hand, if "the state in which the memory is placed in the power saving mode" is replaced by "the state in which the slave cannot readily process a request from the bus master", then memory access to the memory device placed in the power saving mode will not be masked. However, depending on the order in which the memory accesses are issued, a time period during which the memory is placed in the power saving mode is shortened, and the power saving becomes less effective.

SUMMARY OF THE INVENTION

The present invention is directed to a memory control apparatus and a memory control method for increasing efficiency of memory access and power saving in a memory control circuit having a power saving mode.

According to an aspect of the present invention, a memory control apparatus connected with a plurality of masters and a plurality of memories capable of making a transition to a power saving state includes an arbitration unit configured to arbitrate memory accesses from the plurality of the masters and grant a memory access request from one of the plurality of the masters, and a monitoring unit configured to monitor whether each of the plurality of the memories is in the power saving state, wherein according to a detection result obtained by the monitoring unit, the arbitration unit preferentially selects a memory access request to a memory that is not in the power saving state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
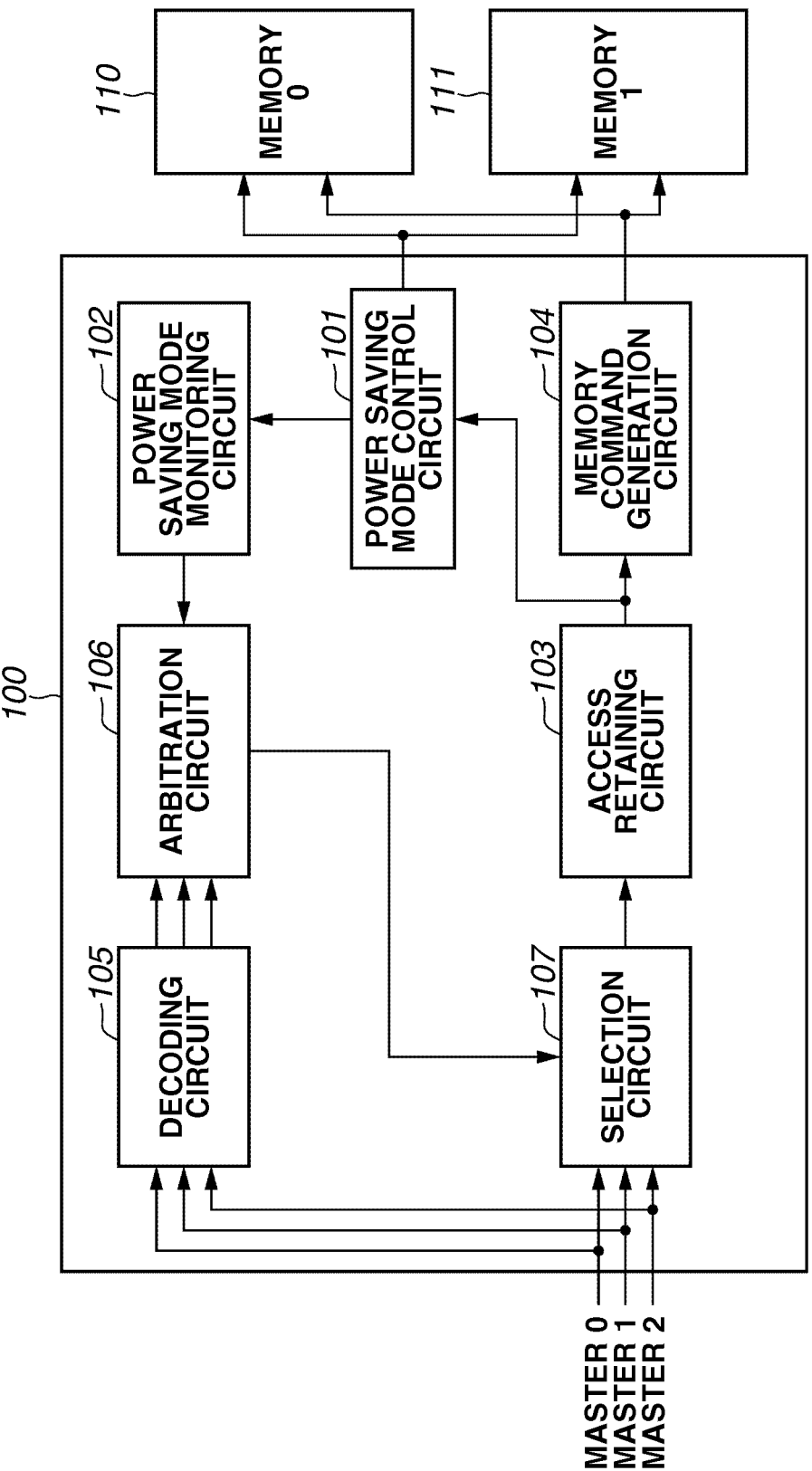
FIG. 1 is a block diagram schematically illustrating a memory control circuit.
Figure 2:
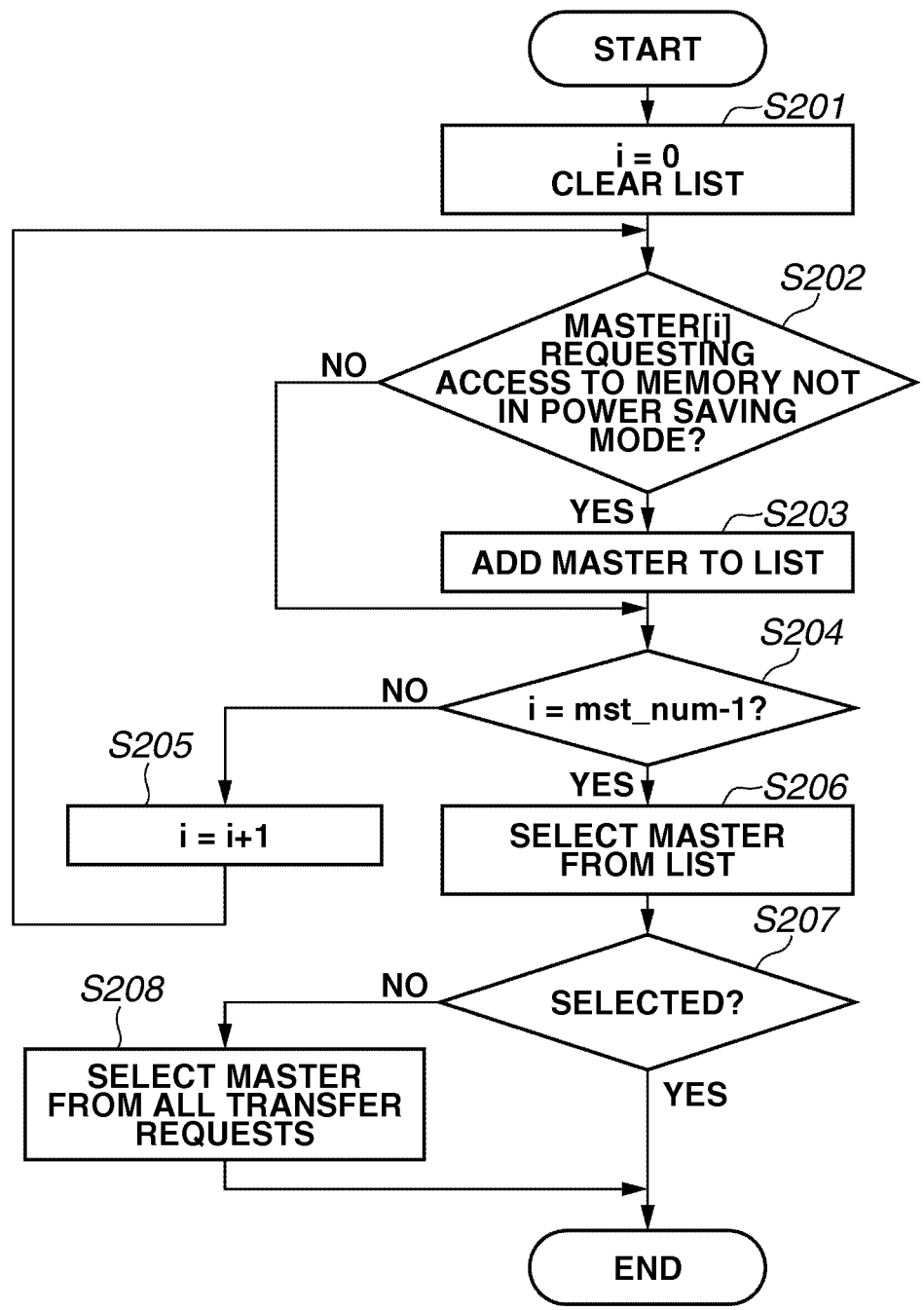
FIG. 2 illustrates a control flow by an arbitration circuit.

Referring to FIGS. 1 and 2, a memory control apparatus (hereinafter referred to as a memory control circuit) according to an exemplary embodiment of the present invention will be described. FIG. 1 is a block diagram schematically illustrating the configuration of the memory control circuit.

In the configuration illustrated in FIG. 1, the memory control circuit 100 accesses a plurality of memories 110 and 111 capable of shifting to a power saving mode (a power saving state). A power saving mode control circuit 101, which is connected to the memories 110 and 111, brings these memories 110 and 111 into or out of the power saving mode (the power saving state). A power saving mode monitoring circuit 102 monitors whether the memories 110 and 111 (e.g. DRAM, DDR-SDRAM, DDR2-SDRAM, DDR3-SDRAM, DDR4-SDRAM) are placed in the power saving mode by the power saving mode control circuit 101. An access storing circuit 103 retains a plurality of memory access commands (hereinafter referred to simply as "accesses").

A memory command generation circuit 104, which is connected with the memories 110 and 111, retrieves an access registered at the top in the access storing circuit 103, converts the access to a command for accessing the memory 110 or 111, and issues the command. A decoding circuit 105 decodes an address to determine whether an externally provided access is to the memory 110 or to the memory 111.

According to the result of the decoding obtained by the decoding circuit 105 and information (detection result) obtained by the power saving mode monitoring circuit 102, an arbitration circuit 106 determines a bus master module (hereinafter referred to as a "bus master") whose access is granted among a plurality of memory access requests. A selection circuit 107 selects the access determined by the arbitration circuit 106, and registers the selected access in the access storing circuit 103.

FIG. 2 is a flowchart illustrating processing in which the arbitration circuit 106 illustrated in FIG. 1 determines which of the access requests from the bus masters is selected. In response to a transfer request made from a bus master, the arbitration circuit 106 starts an arbitration operation. First, in step S201, the arbitration circuit 106 clears an internal variable i and a list in which access requests to a memory that is not in the power saving mode are to be tallied.

Next, in step S202, the arbitration circuit 106 registers, in the list, the bus master numbers of the bus masters that have issued an access request to the memory that is not in the power saving mode, in sequence starting with a bus master 0.

Upon completion of listing of the access requests from all bus masters, the arbitration circuit 106 selects a bus master that is granted the access from the bus masters registered in the list. In selecting the bus master, a known arbitration algorithm, such as a fixed priority scheme and a round robin scheme, may be employed as the bus master selection method.

If a bus master registered in the list is selected (YES in step S207), the process ends as it is. However, if no bus masters are registered in the list (NO in step S207), the arbitration circuit 106 again selects a bus master that is granted the access from bus masters including those that are not on the list.

Due to the operation described above, when an access request to a memory placed in the power saving mode and an access request to a memory that is not placed in the power saving mode contend, the access request to the memory that is not placed in the power saving mode is preferentially selected. This causes the access request to the memory placed in the power saving mode to wait, allowing that memory in the power saving mode to remain in the power saving mode for a long time. Furthermore this causes the plurality of access requests to the memory packed, allowing that decreasing a number of changing state between power saving mode and normal mode, and decreasing power consumption and time for changing state.

A transition to the power saving mode, and a return to the normal state from the power saving mode require more power than a refresh in the normal state. Thus, if the power saving mode is maintained only for a short time, the power required for the state transitions will reduce power efficiency, contrary to the desired effect. As set forth above, the configuration illustrated in FIG. 1 allows a memory to remain in the power saving mode for a long time, so that reduction in power efficiency can be suppressed.

When the access to the memory that is not placed in the power saving mode is complete, the access requests to the memory placed in the power saving mode are automatically granted. At this time, the access requests to the memory that has returned from the power saving mode are all serviced together. This suppresses a transition to such a power saving mode that will last only for a short time, and hence suppressing reduction in power efficiency. The configuration in FIG. 1 illustrates the memory control circuit including three bus masters and two memories. However, the present invention may be applied to any memory control circuits that include two or more memories, to accomplish more effective power saving. The list of the arbitration circuit 106 is stored in a storage unit (not illustrated) therein.

Another configuration will be described below in which an upper limit is set for the number of times each access to a memory that is in the power saving mode is not assigned a priority. In this configuration, the arbitration circuit 106 includes a counter (not illustrated) for each bus master to count the number of times other bus masters have been selected in spite of the presence of a transfer request made from the bus master. When the count value reaches a predetermined number of times, even the access request to the bus master being in the power saving mode is added to the list.

Figure 3:
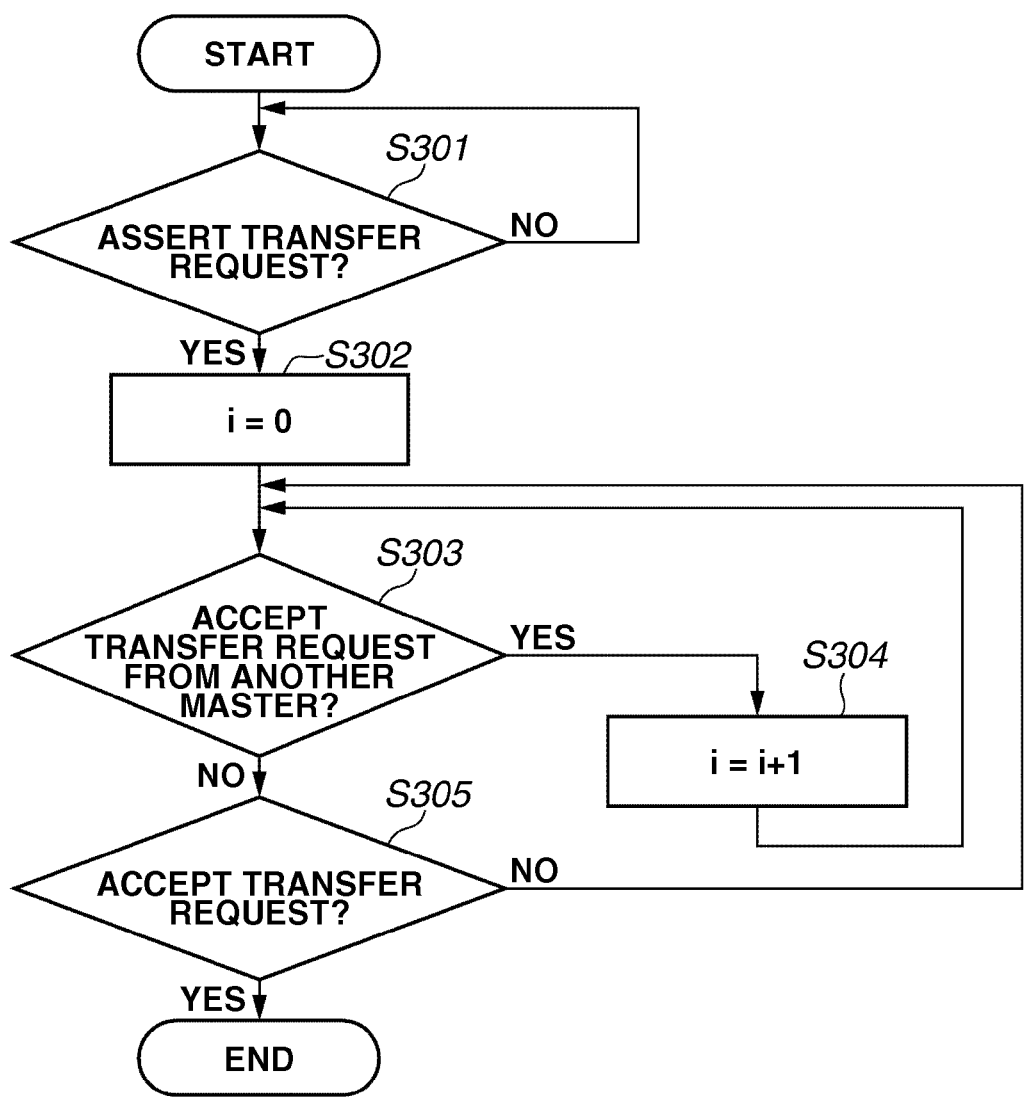
FIG. 3 illustrates a control flow by a counter circuit.

FIG. 3 illustrates how the counter operates to count the number of times other bus masters have been selected after the issuance of a transfer request. In step S301, the counter waits until a memory access (a transfer request) from a bus master is asserted (YES in step S301), and then in step S302, clears a count value i in response to the assertion of the transfer request.

In steps S303 and S304, the counter takes a count each time a transfer request from another bus master is accepted. In step S305, when the initial transfer request is accepted, the counter ends the counting. This counter is provided for each bus master.

Figure 4:
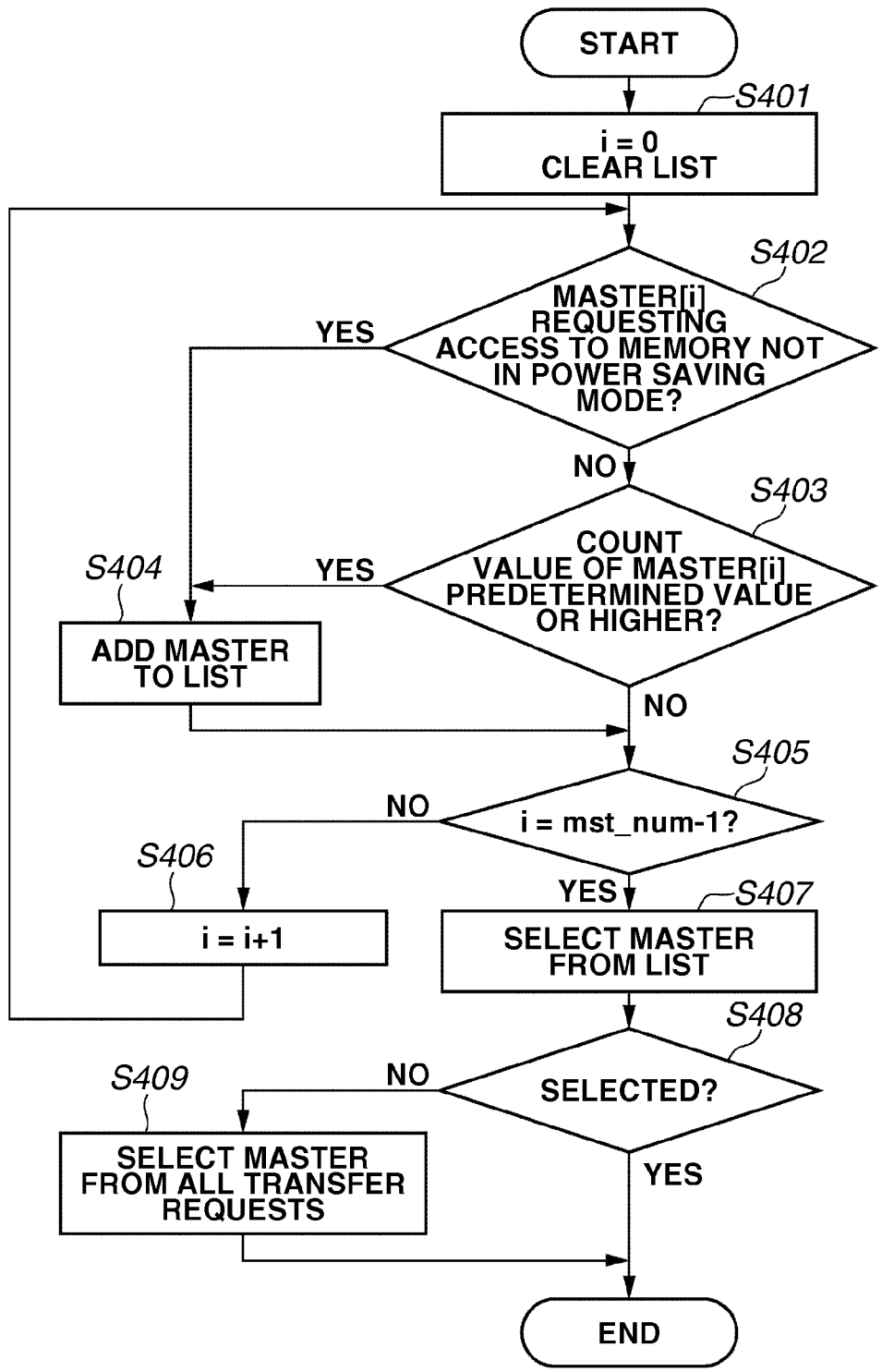
FIG. 4 illustrates a control flow by an arbitration circuit.

FIG. 4 is a flowchart illustrating the processing in the flowchart in FIG. 2 and an additional processing (step S403). In step S403, the arbitration circuit 106 illustrated in FIG. 1 determines which of the access requests from the bus masters is selected using the value of the counter illustrated in FIG. 3. According to the flow of processing illustrated in FIG. 4, the access request to the memory being in the power saving mode that has not been granted the predetermined number of times or more is handled in the same manner as the access to the memory that is not in the power saving mode.

Another configuration will be described below in which an upper limit is employed for a period of time during which each access to a memory that is in the power saving mode is not assigned a priority. For example, the arbitration circuit 106 includes a counter for each bus master, and counts the elapsed time since the initiation of a transfer request. When the count value reaches a predetermined period of time, even the access request to the bus master that is in the power saving mode is added to the list.

A flowchart illustrating how the counter operates to count the elapsed time since the issuance of a transfer request is similar to that illustrated in FIG. 3. The counter for counting the amount of time elapsed after the issuance of the transfer request is provided for each bus master.

FIG. 4 is a flowchart illustrating processing in which the arbitration circuit 106 illustrated in FIG. 1 determines which of the access requests from the bus masters is selected using the value of the counter illustrated in FIG. 3. According to the flow of processing illustrated in FIG. 4, when a predetermined amount of time or longer has elapsed since the issuance of the transfer request, the access request to the memory being in the power saving mode is handled in the same manner as the access to the memory that is not in the power saving mode.

In this way, in the configuration in FIG. 4 described above, the memory access to the memory that is not in the power saving mode are preferentially stored in the access storing circuit 103.

In the foregoing description of the exemplary embodiments, the arbitration circuit 106 stores the list of candidates for the bus master to be selected by the arbitration circuit 106. However, the arbitration circuit 106 does not have to store such information in the form of a list, but may simply store identification information (ID) of bus masters. By using the methods in the foregoing exemplary embodiments in combination, a plurality of memory accesses can be more finely arranged in the order of priority.

The configuration of a memory control circuit employing a reorder configuration instead of an arbiter will be described below with reference to FIGS. 5, 6, and 7.

Figure 5:
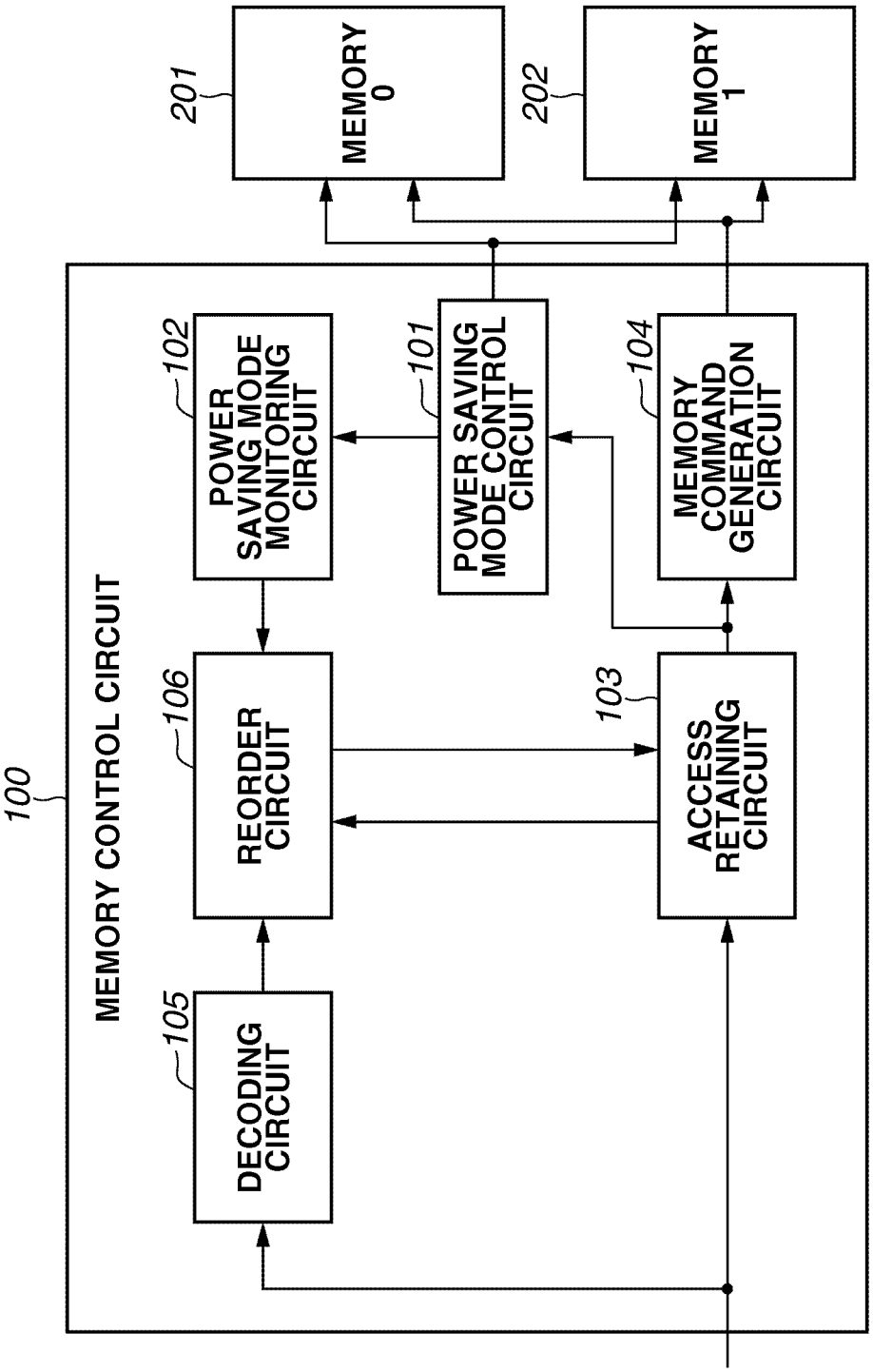
FIG. 5 is a block diagram schematically illustrating a memory control circuit.

FIG. 5 is a block diagram schematically illustrating the memory control circuit. In FIG. 5, the memory control circuit 100 controls accesses to memories 201 and 202. A power saving mode control circuit 101 brings the memories 201 and 202 into or out of a power saving mode. A power saving mode monitoring circuit 102 monitors whether the memories 201 and 202 are placed in the power saving mode by the power saving mode control circuit 101.

An access storing circuit 103 retains a plurality of access requests to the memories 201 and 202. A memory command generation circuit 104 retrieves an access registered at the top in the access storing circuit 103, converts the access to a command for accessing the memory 201 or 202, and issues the command. A decoding circuit 105 decodes an externally provided access to determine whether the access is to the memory 201 or to the memory 202.

A reorder circuit 106 determines where in the access storing circuit 103 the externally provided access is registered, according to the plurality of accesses retained by the access storing circuit 103, the result of the decoding obtained by the decoding circuit 105, and information obtained by the power saving mode monitoring circuit 102.

Figure 6:
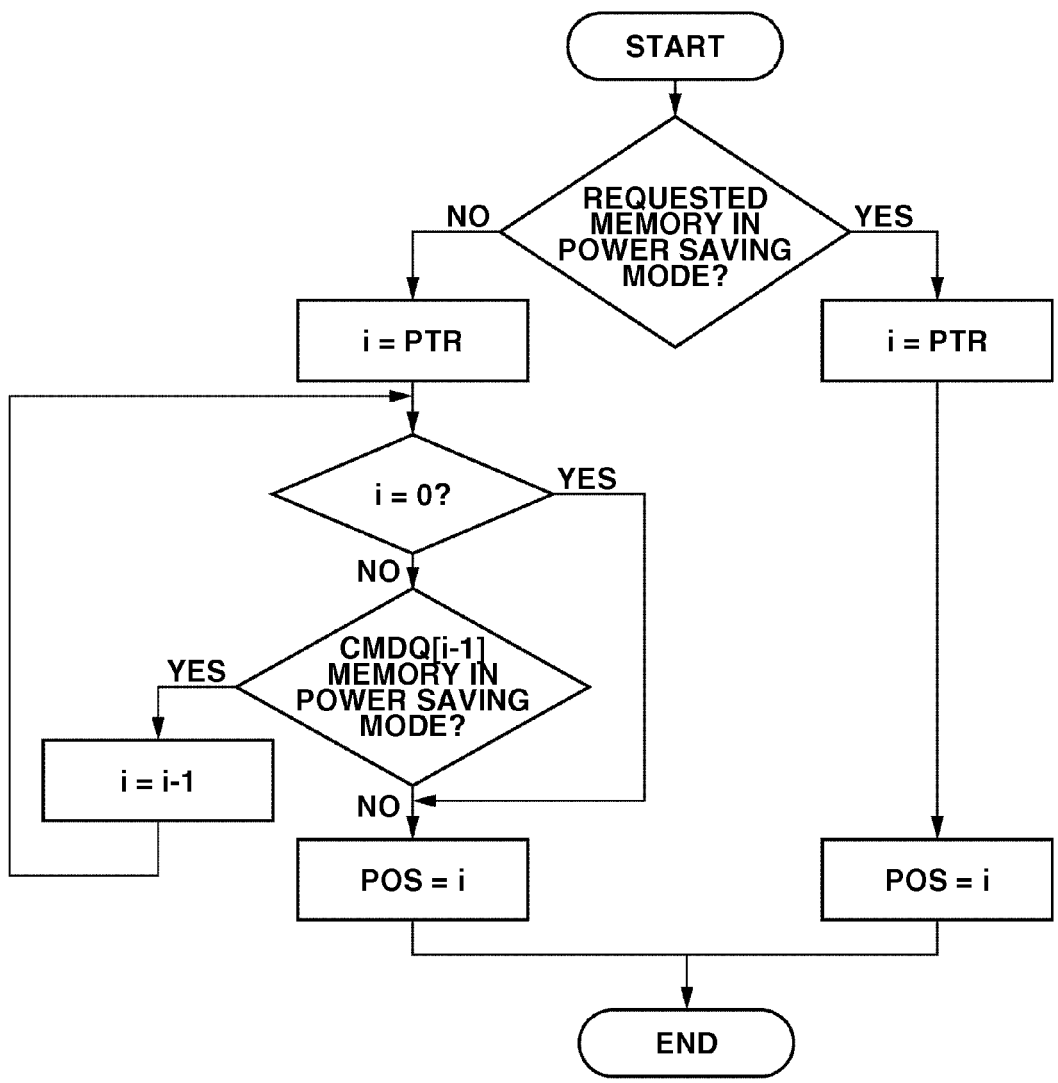
FIG. 6 is a flowchart illustrating processing in which a reorder circuit determines where in an access storing circuit an externally provided access request is registered.

FIG. 6 is a flowchart illustrating processing in which the reorder circuit 106 determines where in the access storing circuit 103 an externally provided access is registered. FIG. 7 is a flowchart illustrating processing in which, in response to an instruction received from the reorder circuit 106, the access storing circuit 103 changes the order of accesses.

Figure 7:
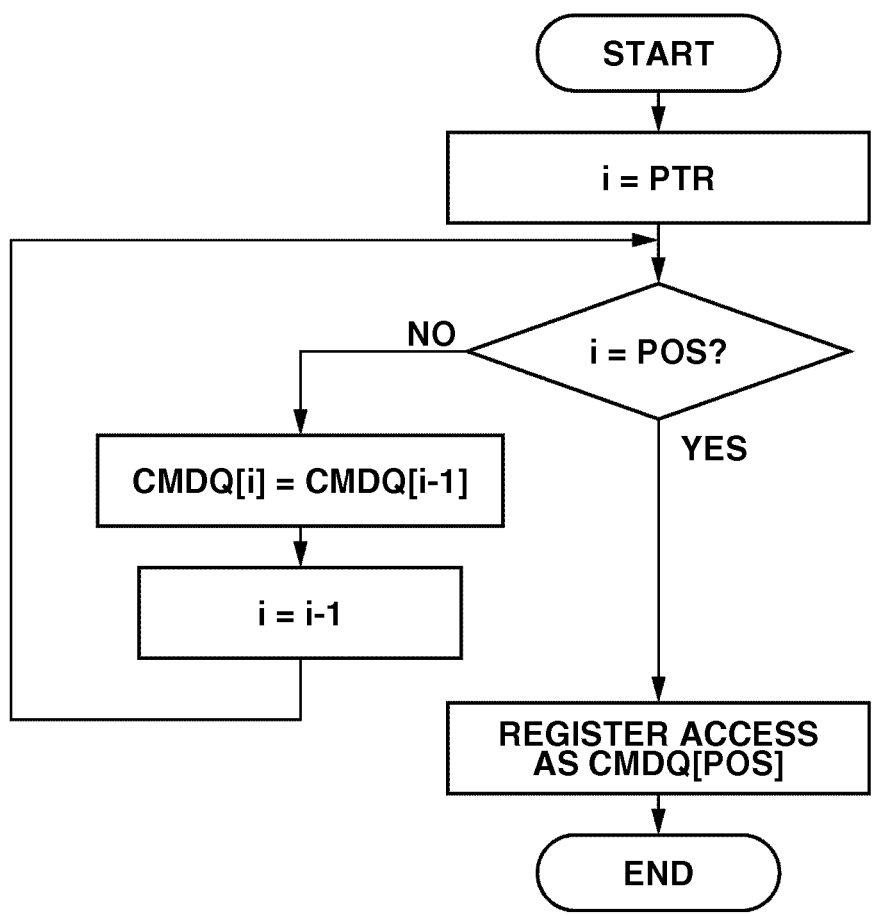
FIG. 7 is a flowchart illustrating processing in which, in response to an instruction received from the reorder circuit, the access storing circuit changes the order of accesses.

In FIGS. 6 and 7, the access storing circuit 103 stores the number of accesses PTR. The access storing circuit 103 further stores an access array CMDQ. A character POS indicates where in the access array CMDQ the externally provided access is registered.

Figure 8:
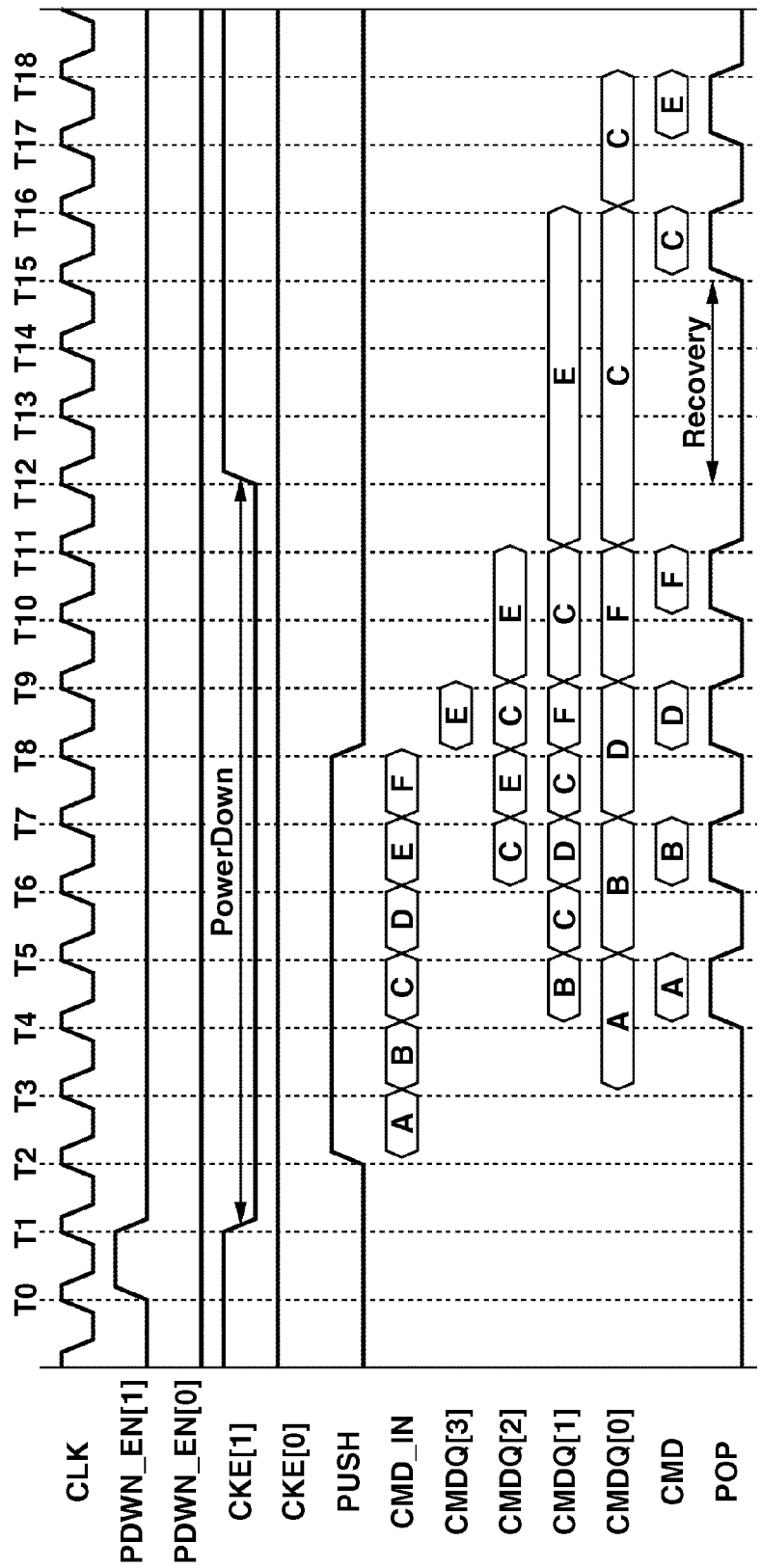
FIG. 8 illustrates an example of waveforms illustrating an operation of the memory control circuit.

Referring to FIG. 8, the operation of the memory control circuit 100 will be described below.

FIG. 8 illustrates an example of waveforms illustrating the operation of the memory control circuit 100. In FIG. 8, a clock CLK operates the memory control circuit 100 and the memories 201 and 202. Trigger signals PDWN_EN[0] and PDWN_EN[1] provided from an external unit (not illustrated) are signals for placing the memories 201 and 202 in the power saving mode.

When the trigger signal PDWN_EN[0] goes to an 'H' level, the power saving mode control circuit 101 places the memory 201 in the power saving mode. When the trigger signal PDWN_EN[1] goes to the 'H' level, the power saving mode control circuit 101 places the memory 202 in the power saving mode.

Signals CKE[0] and CKE[1] are signals for placing the memories 201 and 202 in the power saving mode. When the signal CKE[0] goes to an 'L' level, the memory 201 is placed in the power saving mode. When the signal CKE[1] goes to the 'L' level, the memory 202 is placed in the power saving mode.

A trigger signal PUSH is a signal externally provided for registering an externally provided access in the access storing circuit 103. When the trigger signal PUSH is at an 'H' level, an externally provided access CMD_IN is registered in the access storing circuit 103.

Accesses CMDQ[0] to CMDQ[3] are registered in the access storing circuit 103. The memory command generation circuit 104 retrieves the accesses CMDQ[0] to CMDQ[3] in sequence starting from the access CMDQ[0]. An access CMD is generated by the memory command generation circuit 104 and transmitted to the memories 201 and 202.

A trigger signal POP is used for retrieving, by the memory command generation circuit 104, an access located at the top in the access storing circuit 103. When the trigger signal POP goes to an 'H' level, the access storing circuit 103 shifts the access CMDQ by one.

At time T1, since the trigger signal PDWN_EN[1] is at the 'H' level, the power saving mode control circuit 101 puts the signal CKE[1] to the 'L' level.

At time T2, since the signal CKE[1] is at the 'L' level, the memory 202 makes a transition to the power saving mode.

From time T3 to time T8, since the trigger signal PUSH is at the 'H' level, accesses A to F are input to the access storing circuit 103 as the access CMD_IN. In the present exemplary embodiment, the accesses C and E are to the memory 202, and the other accesses A, B, D, and F are to the memory 201.

At time T3, since the trigger signal PUSH goes to the 'H' level, the access A is input to the access storing circuit 103. At this time, the decoding circuit 105 calculates the fact that the access A is to the memory 201, and informs the reorder circuit 106 of the fact. The reorder circuit 106 generates POS indicating where in the access storing circuit 103 the access A is registered, based on the processing illustrated in FIG. 6. In this case, the memory 201 is not in the power saving mode and the number of accesses PTR=0. Thus, POS=0. In response to this, the access storing circuit 103 registers the access A as the access CMDQ[0].

At time T4, since the trigger signal PUSH is at the 'H' level, the access B is input to the access storing circuit 103. At this time, the decoding circuit 105 calculates the fact that the access B is to the memory 201, and informs the reorder circuit 106 of the fact. The reorder circuit 106 generates POS indicating where in the access storing circuit 103 the access B is registered, based on the processing illustrated in FIG. 6. In this case, the memory 201 is not in the power saving mode and the number of accesses PTR=1. Thus, POS=1. In response to this, the access storing circuit 103 registers the access B as the access CMDQ[1].

At time T5, the access A is issued to the memory 201, and the trigger signal POP goes to the 'H' level. In addition, since the trigger signal PUSH is at the 'H' level, the access C is input to the access storing circuit 103. At this time, the decoding circuit 105 calculates the fact that the access C is to the memory 202, and informs the reorder circuit 106 of the fact. The reorder circuit 106 generates POS indicating where in the access storing circuit 103 the access C is registered, based on the processing illustrated in FIG. 6. In this case, the memory 202 is in the power saving mode and the number of accesses PTR=2. Thus, POS=2.

In response to this, the access storing circuit 103 registers the access C as the access CMDQ[2]. However, at the same time, the trigger signal POP is at the 'H' level, causing the access storing circuit 103 to shift the access CMDQ by one to register the access B as the access CMDQ[0] and the access C as the access CMDQ[1].

At time T6, since the trigger signal PUSH is at the 'H' level, the access D is input to the access storing circuit 103. At this time, the decoding circuit 105 calculates the fact that the access D is to the memory 201, and informs the reorder circuit 106 of the fact. The reorder circuit 106 generates POS indicating where in the access storing circuit 103 the access D should be registered, based on the processing illustrated in FIG. 6.

In this case, the memory 201 is not in the power saving mode, and the number of accesses PTR=2. Further, the access C as the access CMDQ[1] is to the memory 202 that is in the power saving mode. Thus, POS=1. In response to this, the access storing circuit 103 shifts the access C from the access CMDQ[1] to the access CMDQ[2], and registers the access D as the access CMDQ[1].

At time T7, the access B is issued to the memory 201, and the trigger signal POP goes to the 'H' level. In addition, since the trigger signal PUSH is at the 'H' level, the access E is input to the access storing circuit 103. At this time, the decoding circuit 105 calculates the fact that the access E is to the memory 202, and informs the reorder circuit 106 of the fact.

The reorder circuit 106 generates POS indicating where in the access storing circuit 103 the access E is registered, based on the processing illustrated in FIG. 6.

In this case, the memory 202 is in the power saving mode and the number of accesses PTR=3. Thus, POS=3. In response to this, the access storing circuit 103 registers the access C as the access CMDQ[3]. At the same time, however, since the trigger signal POP is at the 'H' level, the access storing circuit 103 shifts the access CMDQ by one to register the access E as the access CMDQ[2].

At time T8, the trigger signal PUSH is at the 'H' level, and thus the access F is input to the access storing circuit 103. At this time, the decoding circuit 105 calculates the fact that the access F is to the memory 201, and informs the reorder circuit 106 of the fact. The reorder circuit 106 generates POS indicating where in the access storing circuit 103 the access F is registered, based on the processing illustrated in FIG. 6.

In this case, the memory 201 is not in the power saving mode, and the number of accesses PTR=3. Further, the accesses C and E as the accesses CMDQ[1] and CMDQ[2] are to the memory 202 that is in the power saving mode. Thus, POS=1. In response to this, the access storing circuit 103 shifts the accesses C and E to the accesses CMDQ[2] and CMDQ[3], and registers the access F as the access CMDQ[1].

At time T9 and time T11, the accesses D and F are issued to the memory 201.

At time T12, the access C is at the top in the access storing circuit 103, and the power saving mode control circuit 101 turns off the power saving mode of the memory 202. In other words, the power saving mode control circuit 101 puts the signal CKE[1] to the 'H' level.

At time T13, the memory 202 detects that the signal CKE[1] is at the 'H' level, and goes out of the power saving mode.

At time T16, the memory command generation circuit 104 waits until the memory 202 returns from the power saving mode, and then issues the access C. In the present exemplary embodiment, the memories 201 and 202 require three cycles to return from the power saving mode.

At time T18, the access E is issued to the memory 202.

Figure 9:
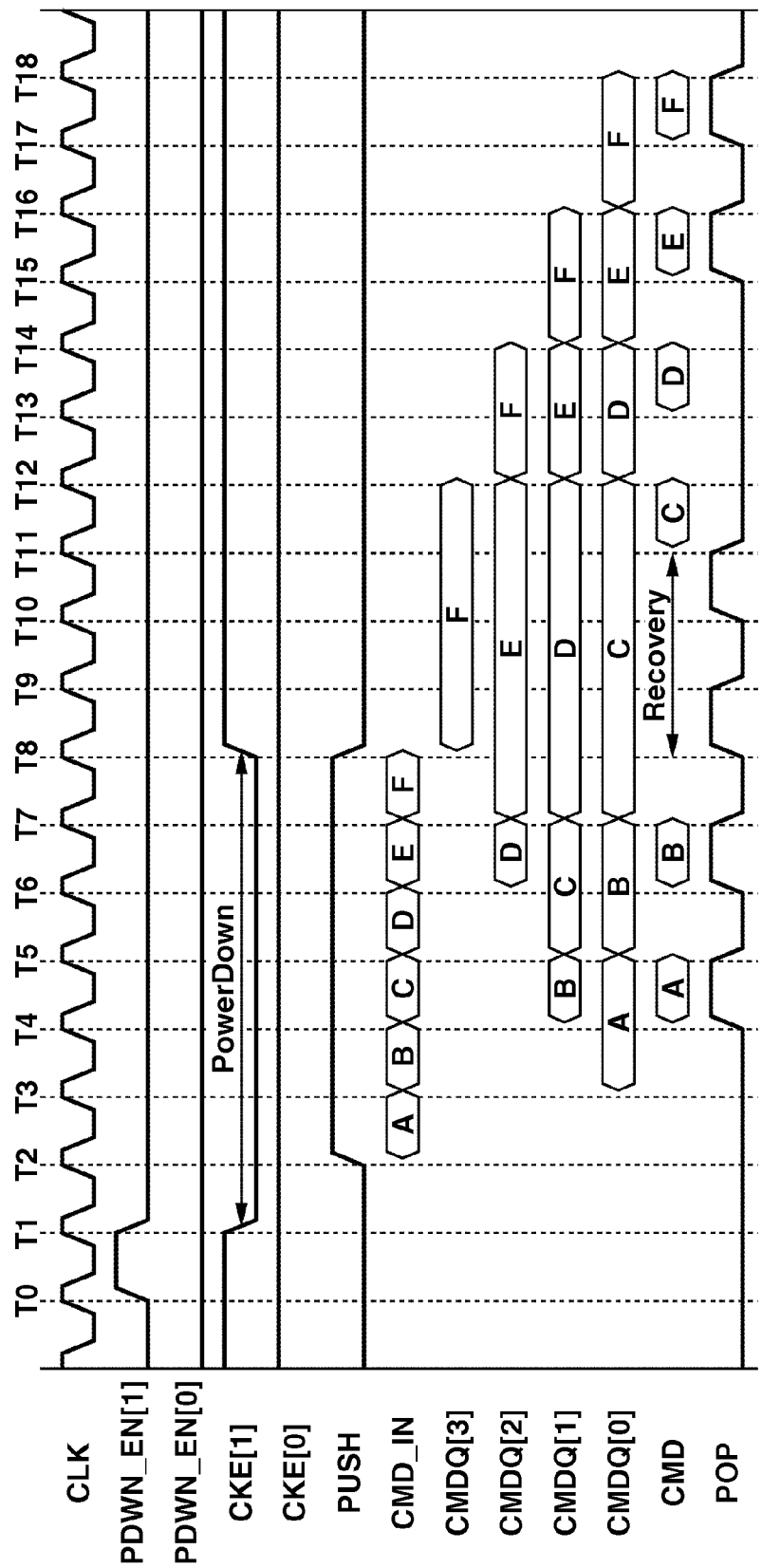
FIG. 9 illustrates an example of waveforms observed when a reorder function is disabled.

FIG. 9 illustrates waveforms observed when the reorder function is disabled. In FIG. 9, the memory 202 is placed in the power saving mode for six cycles. In contrast, in FIG. 8, in which the reorder function is enabled, the time during which the memory 202 is placed in the power saving mode is extended to eleven cycles.

Considering the performance of access to a memory that is in the power saving mode, an upper limit may be set for the number of times one access is overtaken by another access.

For example, the access storing circuit 103 includes a counter for each access, and counts the number of times the access has been overtaken by another access. When the count value has reached a predetermined number of times, the access storing circuit 103 informs the reorder circuit 106 of that fact. The reorder circuit 106 generates POS so that the access whose count value has reached the predetermined number of times will not be overtaken by other accesses.

Figure 10:
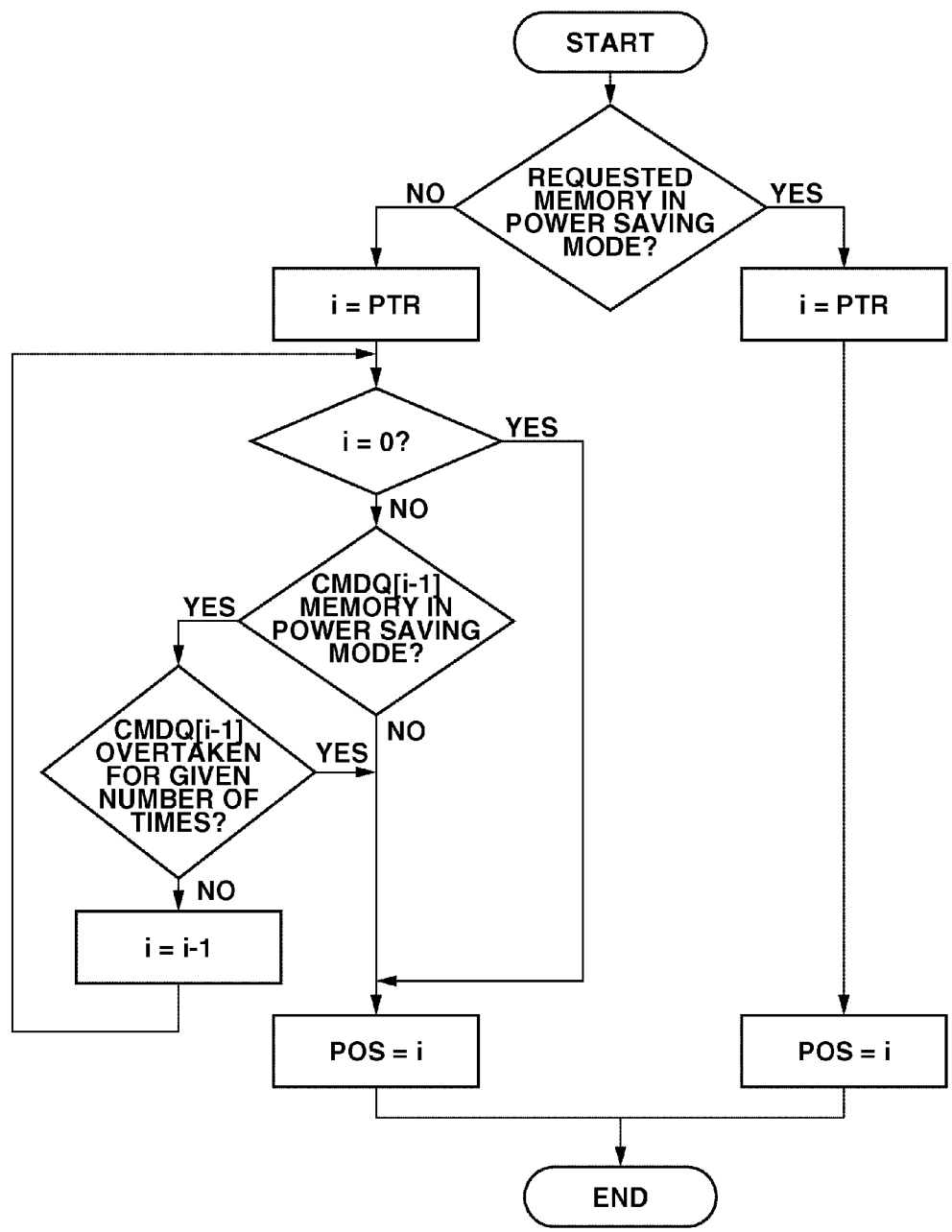
FIG. 10 is a flowchart illustrating processing in which the reorder circuit determines where in the access storing circuit an externally provided access request to be reregistered.

FIG. 10 illustrates an example of processing in which the reorder circuit 106 determines where in the access storing circuit 103 the access is registered at this time. The processing in FIG. 10 can set a limit so that each access that has been overtaken by other accesses a predetermined number of times will no longer be overtaken by other accesses.

In addition, considering the performance of access to a memory that is in the power saving mode, an upper limit may be set in term of time so that once a predetermined period of time has elapsed since one access is registered in the access storing circuit 103, that access will not be overtaken by other accesses.

For example, the access storing circuit 103 includes a counter for each access, and counts the number of cycles that have elapsed since the registration of the access in the access storing circuit 103. When the count value reaches a predetermined number of times, the access storing circuit 103 informs the reorder circuit 106 of that fact. The reorder circuit 106 generates POS so that the access whose count value has reached the predetermined number of times will not be overtaken by other accesses.

The processing in which the reorder circuit 106 determines where in the access storing circuit 103 the access is registered at this time is the same as that illustrated in FIG. 10 in the second exemplary embodiment. In this way, a limit can be set so that each access that has been registered in the access storing circuit 103 for a predetermined period of time will no longer be overtaken by other accesses.

According to the foregoing exemplary embodiments, in a memory control circuit connected with a plurality of memory devices, accesses to a memory placed in a power saving mode are assigned a low priority when processed. This processing enables the memory to be placed in the power saving mode for a long time, so that the power consumption in the entire system can be reduced.

The exemplary embodiments of the present invention have been described in detail. The present invention is not limited to those particular exemplary embodiments, but is capable of various modifications and changes without departing from the scope of the present invention as described in the appended claims. For example, instead of performing reordering, an output interface (IF) may be provided which preferentially outputs, from a configuration that simply stores a plurality of access requests, a memory access request to a memory that is not in a power saving state.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-209418 filed Sep. 17, 2010, which is hereby incorporated by reference herein in its entirety.

What is claimed is:

1. A memory control apparatus connected with a plurality of memories capable of making a transition to a power saving state and a plurality of masters by a common bus, the memory control apparatus comprising:
    an arbitration unit configured to arbitrate memory accesses from the plurality of the masters and grant a memory access request from one of the plurality of the masters; and
    a monitoring unit configured to monitor whether each of the plurality of the memories is in the power saving state,
    wherein according to a detection result obtained by the monitoring unit, if a memory access request to a memory that is in the power saving state and a memory access request to a memory that is not in the power saving state contend with each other in the common bus, the arbitration unit preferentially selects and grants the memory access request to the memory that is not in the power saving state.

2. The memory control apparatus according to claim 1, wherein according to the detection result obtained by the monitoring unit, the arbitration unit designates, as candidates, memory access requests to the memory that is not in the power saving state and selects from the candidates a memory access request to be granted.

3. The memory control apparatus according to claim 2, wherein if the candidates include no memory access request to be selected, the arbitration unit designates, as candidates, memory access requests to a memory that is in the power saving state, and selects from the candidates a memory access request to be granted.

4. The memory control apparatus according to claim 1, wherein if a memory access request from at least one of the plurality of masters is to a memory placed in the power saving state, the arbitration unit lowers a priority of the memory access request.

5. The memory control apparatus according to claim 1, wherein if a memory access request to a memory placed in the power saving state is not accepted a predetermined number of times or more, the arbitration unit selects a memory access request from a plurality of memories including the memory access request to the memory being in the power saving state.

6. The memory control apparatus according to claim 1, wherein if a memory access request to a memory placed in the power saving state is not accepted for a predetermined period of time or longer, the arbitration unit selects a memory access request from a plurality of memories including the memory access request to the memory being in the power saving state.

7. A memory control apparatus connected with a plurality of memories capable of making a transition to a power saving state and a plurality of masters by a common bus, the memory control apparatus comprising:
    an access storing unit configured to retain a plurality of access requests to the memories;
    a monitoring unit configured to monitor whether each of the plurality of the memories is in the power saving state; and
    a command generation unit configured to, if a memory access request to a memory that is in the power saving state and a memory access request to a memory that is not in the power saving state contend with each other in the common bus, preferentially output from the access storing unit a memory access request to the memory that is not in the power saving state, according to a detection result obtained by the monitoring unit.

8. A memory control apparatus connected with a plurality of memories capable of making a transition to a power saving state and a plurality of masters by a common bus, the memory control apparatus comprising:
    an access retaining unit configured to store a plurality of access requests to the memories;
    a monitoring unit configured to monitor whether each of the plurality of the memories is in the power saving state; and
    a reorder unit configured to reorder the access request stored in the access retaining unit according to a detection result obtained by the monitoring unit, if a memory access request to a memory that is in the power saving state and a memory access request to a memory that is not in the power saving state contend with each other in the common bus, so that a memory access request to the memory that is not in the power saving state is issued first.

9. A method for controlling a memory in a memory control apparatus connected with a plurality of memories capable of making a transition to a power saving state and a plurality of masters by a common bus, the method comprising:

arbitrating memory accesses from the plurality of the masters and grant a memory access request from one of the plurality of the masters; and monitoring whether each of the plurality of the memories is in the power saving state; and according to a detection result obtained by the monitoring, if a memory access request to a memory that is in the power saving state and a memory access request to a memory that is not in the power saving state contend with each other in the common bus, preferentially selecting and granting the memory access request to a memory that is not in the power saving.

10. A method for controlling a memory in a memory control apparatus connected with a plurality of memories capable of making a transition to a power saving state and a plurality of masters by a common bus, and including an access storing unit configured to retain a plurality of access requests to the memories, the method comprising:

monitoring whether each of the plurality of the memories is in the power saving state; and according to a detection result obtained by the monitoring, if a memory access request to a memory that is in the power saying state and a memory access request to a memory that is not in the power saying state contend with each other in the common bus, preferentially outputting from the access storing unit a memory access request to a memory that is not in the power saving state.

11. A method for controlling a memory in a memory control apparatus connected with a plurality of memories capable of making a transition to a power saying state and a plurality of masters by a common bus, and including an access retaining unit configured to store a plurality of access requests to the memories, the method comprising:

monitoring whether each of the plurality of the memories is in the power saving state; and according to a detection result obtained by the monitoring, if a memory access request to a memory that is in the power saying state and a memory access request to a memory that is not in the power saying state contend with each other in the common bus, reordering the access request stored in the access retaining unit so that the memory access request to a memory that is not in the power saying state is issued first.

* * * * *